(12) United States Patent
Jacobi et al.

(10) Patent No.: US 12,502,728 B2
(45) Date of Patent: Dec. 23, 2025

(54) DETECTION OF FOREIGN PARTS AND SLAG ON A WORKTABLE

(71) Applicant: BYSTRONIC LASER AG, Niederoenz (CH)

(72) Inventors: Stefan Alfons Jacobi, Bad Westernkotten (DE); Herbert Villiger, Bolken (CH)

(73) Assignee: BYSTRONIC LASER AG, Niederoenz (CH)

( * ) Notice: Subject to any disclaimer, the term of this patent is extended or adjusted under 35 U.S.C. 154(b) by 0 days.

(21) Appl. No.: 17/756,353

(22) PCT Filed: Dec. 14, 2020

(86) PCT No.: PCT/EP2020/086004
§ 371 (c)(1),
(2) Date: May 23, 2022

(87) PCT Pub. No.: WO2021/122466
PCT Pub. Date: Jun. 24, 2021

(65) Prior Publication Data
US 2022/0410307 A1    Dec. 29, 2022

(30) Foreign Application Priority Data

Dec. 17, 2019 (EP) ..................................... 19216784

(51) Int. Cl.
*G01N 21/95*        (2006.01)
*B23K 26/03*        (2006.01)
(Continued)

(52) U.S. Cl.
CPC ............ *B23K 26/032* (2013.01); *B23K 26/16* (2013.01); *B23K 37/0408* (2013.01);
(Continued)

(58) Field of Classification Search
CPC .. B23K 26/032; B23K 26/16; B23K 37/0408; B23K 37/0461; B23K 37/08; G01N 21/95
(Continued)

(56) References Cited

U.S. PATENT DOCUMENTS 4,585,343 A * 4/1986 Schave ................ G01N 21/896
356/613
5,103,087 A * 4/1992 Hofliger ................ G01N 21/15
356/239.5
(Continued)

FOREIGN PATENT DOCUMENTS

CN        201596852 U    10/2010
DE    202010017944 U1     3/2013
(Continued)

OTHER PUBLICATIONS

International Search Report and Written Opinion, mailed Mar. 30, 2021, from PCT/EP2020/086004 filed Dec. 14, 2020.
(Continued)

*Primary Examiner* — Isiaka O Akanbi
(74) *Attorney, Agent, or Firm* — Workman Nydegger (57) ABSTRACT

The invention relates to a device for checking for foreign parts and/or deposits on support elements of a worktable, wherein the support elements are provided to support a flat workpiece for cutting with a laser or a water jet, wherein the support elements are arranged parallel to one another and have a first distance from one another, comprising: a sensor for detecting the foreign parts and/or the deposits in the space between two respective support elements.

11 Claims, 4 Drawing Sheets

(51) Int. Cl.
  *B23K 26/16* (2006.01)
  *B23K 37/04* (2006.01)
  *B23K 37/08* (2006.01)
(52) U.S. Cl.
  CPC .......... *B23K 37/0461* (2013.01); *B23K 37/08* (2013.01); *G01N 21/95* (2013.01)
(58) Field of Classification Search
  USPC ............................................. 356/237.1–237.6
  See application file for complete search history.

(56) References Cited

U.S. PATENT DOCUMENTS

| | | | | |
|---|---|---|---|---|
| 5,251,010 | A * | 10/1993 | Maltby, Jr. ........... | G01N 21/896 356/613 |
| 5,495,337 | A * | 2/1996 | Goshorn .............. | G01N 21/956 356/627 |
| 5,598,262 | A * | 1/1997 | Jutard .................. | G01N 21/896 250/559.46 |
| 6,437,357 | B1 * | 8/2002 | Weiss ................... | G01N 21/896 250/559.46 |
| 9,566,677 | B2 * | 2/2017 | Wu ...................... | B23K 26/083 |
| 2004/0179193 | A1 * | 9/2004 | Maezono ............. | G01N 21/896 356/239.1 |
| 2007/0132988 | A1 * | 6/2007 | Gargano .......... | G01N 21/95692 356/237.6 |
| 2009/0107896 | A1 * | 4/2009 | Gochar, Jr. .......... | G01N 21/909 425/169 |
| 2010/0045975 | A1 * | 2/2010 | Zoeller, III ...... | G01N 21/95692 356/239.2 |
| 2010/0132526 | A1 * | 6/2010 | Wahl .................. | B23K 37/0461 83/438 |
| 2019/0358748 | A1 * | 11/2019 | Tanaka .................. | B23K 26/16 |
| 2020/0016647 | A1 * | 1/2020 | Deiss .................... | B21D 28/06 |

FOREIGN PATENT DOCUMENTS

| | | | |
|---|---|---|---|
| JP | H04339582 A | 11/1992 | |
| WO | WO-2007137613 A1 * | 12/2007 | ......... B23K 37/0461 |

OTHER PUBLICATIONS

International Preliminary Report on Patentability, mailed Apr. 8, 2022, from PCT/EP2020/086004 filed Dec. 14, 2020.

* cited by examiner

DETECTION OF FOREIGN PARTS AND SLAG ON A WORKTABLE

The present invention relates to a device for the detection of foreign parts and deposits on a worktable of a laser or water jet cutting system and a method for use.

It is known in the prior art that flat workpieces are cut or otherwise processed with a laser or a water jet. It is also known to use sensors in such systems.

For example, JP 4339582A describes a laser cutting system, in which a camera checks the cut-outs for dimensional accuracy. In CN 201596852U, a camera is used to control a cutting system.

A flat workpiece, for example a piece of sheet metal, that is to be cut by a laser cutting system, is placed on a grid. The grid consists of parallel grid bars or support elements between which there is a defined distance. After the sheet metal has been cut, the cut parts can fall down between the support elements through the gap and are caught on the base of the worktable. These workpieces can then be processed further.

However, it can occur that a cut-out part gets lodged in the space between two support elements. In addition, the laser cutting can cause deposits, in particular so-called slag, to form, which attaches itself to a support element.

The lodged parts must be removed from the grid. The slag must also be removed from the grid. Otherwise, it can occur that in the next work process another flat workpiece to be processed does not lie flat on the grid and cannot be cut correctly.

If there are foreign parts, such as lodged parts, or deposits between the support elements, a crash can also occur if the forks of a rake-like lifting system travel between the support elements or as soon as the forks thereof are moved upwards in order to lift and transport the scrap skeleton or the cut-out parts away from the worktable.

The prerequisite for removing lodged parts and cleaning the grid of deposits is to detect that there are parts or deposits on the grid in question.

WO 2007/137613 A1 discloses a system for cleaning support elements of a working table, used for a laser processing machine. The supporting elements are scanned by means of a sensor from the above, such as that the sensor is provided in the laser cutting head.

US 2019/0358738 A1 discloses a system for cleaning a workpiece from protrusions, which are extending out of the plane of the workpiece. A light source and receiver module is used for removing protruding portions or contamination elements on the surface of the workpiece.

DE 20 2010 017 944 U1 discloses a method for checking whether parts of a workpiece to be cut haven been cut out completely by using a distance measurement unit.

An aim of the invention is therefore to provide a device and a method that checks whether a rack, such as a grid, is free from deposits or other foreign parts, in particular free from foreign parts that have been cut out from the flat workpiece.

As a first embodiment of the invention, a device for checking for foreign parts and/or deposits on support elements of a worktable is provided, wherein the support elements are provided to support a flat workpiece, in particular a piece of sheet metal, for processing, in particular for cutting with a laser or a water jet, wherein the support elements are arranged parallel to one another and have a first distance from one another, comprising: a sensor for detecting the foreign parts and/or the deposits in the space between two respective support elements. The sensor is an optical sensor. The sensor is displaceable arranged along the worktable and in particular perpendicular to the support elements in such a way that a cross-sectional area of the space between two support elements can be checked and in that the device comprises an element for illuminating deposits and/or foreign parts, wherein the element is configured to automatically indicate the location of the deposits and/or the foreign parts.

The optical sensor can be in data exchange with an image processing unit which is designed to generate an output signal. The output signal differentiates between the detected objects, in particular it is sensed whether a deposit (e.g. slag) or a foreign part (e.g. a tilted cut part, or a lodged part) has been detected. The output signal controls various further processing measures.

The support with support elements running in parallel can be a grid with grid bars (running in parallel). The dimensioning of the support elements and their spacing can be freely configured for the implementation of the invention, so that the invention can also be used for different types of supports.

By arranging a sensor, foreign parts, in particular parts cut (out) from the workpiece, which have jammed between the support elements, can be detected. If such jammed foreign parts were not removed before the flat workpiece is transported away from the worktable after machining, a crash could occur. In particular, a lifting system (which can also be designed as a transport system), which is provided for lifting the sheet metal from the worktable (e.g. a dual-fork system), could collide with the jammed foreign part or the support elements. This could damage the prongs/fork prongs/forks of the lifting system and/or the support elements.

In the following, the term "flat workpiece" should be understood to mean a workpiece that can consist of metal or other materials (e.g. plastic) and is to be processed by a processing machine. In a preferred embodiment of the invention, it is a piece of sheet metal. For the sake of readability, the term "sheet metal" is used in the following; however, other flat or three-dimensional workpieces (e.g. tubes) are also within the scope of the invention.

As a second embodiment of the invention, a method for detecting foreign parts and/or deposits on support elements of a worktable with a device is provided, comprising the steps: checking the space between a first and a second support element for foreign parts and/or deposits, such as slag for example, and illuminating the locations on the worktable, at which deposits and/or foreign parts have been detected by the optical sensor in the space.

As a third embodiment of the invention, a computer program product is provided which has at least one software program for implementing a method when the software program is executed on a computer or a computer-based unit.

As a fourth embodiment of the invention, a computer program is provided, distributable by electronic data transmission, having computer program code means which are adapted in such a way that, when the program is loaded onto a computer, the same can execute the procedure.

Exemplary embodiments are described in the dependent claims.

According to a further exemplary embodiment of the invention, a device is provided, wherein the sensor checks the space between a second distance to a first support element and a third distance to a second support element.

The prongs/fork prongs/forks of the holding system travel into the space between two opposing support elements, i.e. under the completed, machined flat workpiece to be lifted in order to lift the same and transport it away. This space, into which the prongs enter, is advantageously checked for deposits or other foreign parts. A crash of the lifting system can be excluded in this way.

In yet another embodiment of the invention, a device is provided, wherein the sum of the second distance and the third distance is smaller than the first distance.

According to an exemplary embodiment of the invention, a device is provided, wherein the first distance is in a range between 50 and 60 mm, and is in particular 54 mm and/or wherein the second distance is in a range between 10 and 15 mm and is in particular a maximum of 12 mm and/or wherein the third distance is in a range between 10 and 15 mm and is in particular a maximum of 12 mm. The first, second and/or third distance can be preconfigured. This has the advantage that the system can be adapted to different workbenches or worktables.

If the deposits on a support element do not "grow" further than the preconfigured distance, for example 12 mm in the direction of the opposite support element, it can be assumed that the space is sufficiently free of deposits that a crash cannot occur.

In a further embodiment according to the invention, a device is provided, wherein the sensor is designed as a transmitted light or incident light sensor.

If the sensor is used in a transmitted light method, the sensor beam can be adjusted easily and precisely. It can be ensured that the relevant space is checked for deposits and foreign parts. If the sensor is switched using a reflected light method, the transmitter and the receiver are advantageously at the same location, which makes maintenance of the sensor easier.

According to a further exemplary embodiment of the present invention, a device is provided, wherein the sensor comprises a transmitter and a receiver, wherein the transmitter is arranged opposite the receiver in such a way that the sensor beam is aligned in parallel and/or obliquely with the respective support elements, the space between which is to be checked, or wherein the transmitter and the receiver are arranged next to one another for checking the space by means of the triangulation method.

If the sensor beam is not aligned parallel to the support elements the space of which is to be checked, a surface of the space can advantageously be checked for foreign parts with only one sensor beam.

In a further embodiment according to the invention, a device is provided, wherein the device detects that the flat workpiece is not a foreign part or deposits. In particular, a further signal processing can be carried out which differentiates between these two aforementioned cases. The sensor can be designed as an optical sensor. The sensor can comprise or contain a distance measurement (for example based on the light transit time).

A check for foreign parts and deposits is carried out before the lifting system is inserted between the corresponding support elements. As a result, at the time of the test, the processed flat workpiece, in particular sheet metal, is still on the worktable. It could be that the sheet metal is in the field of view of the sensor. In this case, the sheet metal is advantageously not confused with deposits or a foreign part.

According to a further exemplary embodiment of the present invention, a device is provided, wherein the device comprises an element for displaying, in particular illuminating, deposits and/or foreign parts.

If deposits or a jammed foreign part are detected, the deposits or the foreign part must be removed before the lifting system can be used. If the deposit or the foreign part has to be removed by hand, it is advantageous that the device according to the invention automatically indicates the location of the deposits or the foreign part to the responsible worker by means of illumination, for example by means of a red point of light.

According to a further exemplary embodiment of the present invention, a device is provided, wherein the sensor is displaceable along the worktable.

The sensor can advantageously be displaced along the worktable in order to be able to test a plurality of spaces with a single sensor.

In a further embodiment of the invention, a method is provided, having the step of: displacing the sensor along the worktable and checking the space between a third and a fourth support element for foreign parts and/or slag.

According to a further exemplary embodiment of the present invention, a method is provided, wherein the sensor checks the space between a first distance to the first support element and a second distance to the second support element.

According to a further exemplary embodiment of the present invention, a method is provided, wherein the first distance and/or the second distance are in a range between 10 and 15 mm and are preferably at least 12 mm.

In a further embodiment according to the invention, a method is provided, additionally having the step of: displaying, in particular illuminating, the locations on the worktable, at which deposits and/or foreign parts have been detected by the sensor in the space.

According to a further exemplary embodiment of the present invention, a method is provided, further having the step of: removing the deposits and/or the foreign parts by means of compressed air and/or by means of the laser or the water jet or removing the deposits and/or foreign parts by means of vibration, in particular vibration of a system for lifting the sheet metal from the worktable after it has been processed.

The deposits or the foreign part can advantageously be "shaken free" by the lifting system. This "shaking free" can in particular be carried out automatically since, according to the invention, the location of the deposit or the foreign part is known by the device.

An idea of the invention can be seen to use optical sensors in such a way that it can be determined whether there is a deposit on a grid and said grid therefore requires cleaning or whether workpieces are jammed in the grid. This can prevent a crash with a lifting system and the worktable. In addition, it is prevented that the sheet metal to be processed does not lie flat on the grid due to deposits, which can result in workpieces with incorrect dimensions in a subsequent work step.

The individual features can of course also be combined with one another, which in some cases can also have advantageous effects that go beyond the sum of the individual effects.

BRIEF DESCRIPTION OF THE FIGURES

Further details and advantages of the invention will become clear with reference to the exemplary embodiments shown in the drawings. In the figures.

DETAILED DESCRIPTION OF EXEMPLARY EMBODIMENTS

Figure 1:
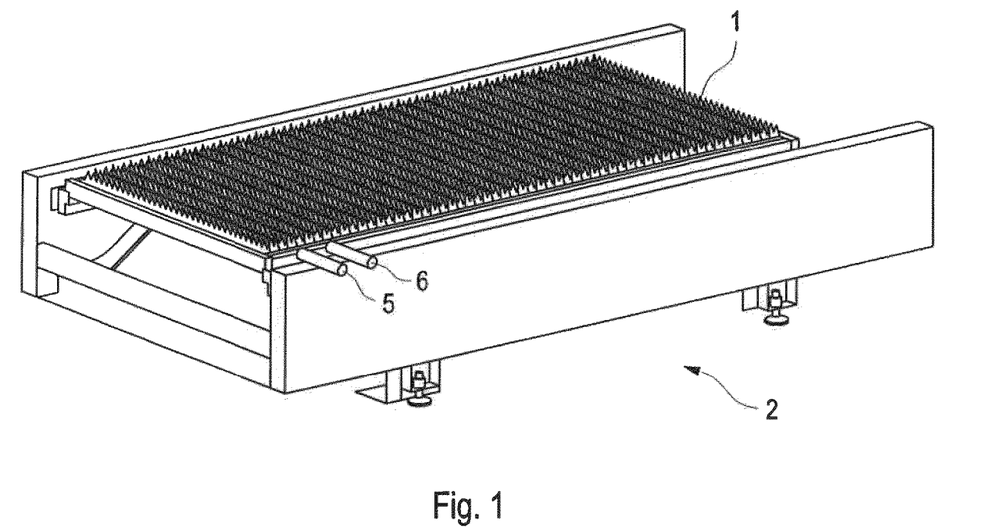
FIG. 1 shows a shuttle table/worktable 2 with a grid made of individual support elements 1 in a perspective view, on which sheet metal can be placed for processing with a laser or a water jet, wherein according to the invention a distance sensor 5, 6 is aligned such that it can discern deposits or foreign parts between and along the support elements 1.

FIG. 1 shows a worktable in a perspective view with support elements 1, on which a flat workpiece, for example sheet metal, can be arranged in order to be cut by means of a laser. The cutting process can cause a deposit, so-called slag, to form, which can become lodged on the support elements. In addition, after processing the workpiece, in particular after cutting the sheet metal, the cut workpieces can get lodged in the grid. Slag can therefore form in the space between two adjacent support elements. In addition, cut-out parts can get stuck.

The sensor 5, 6 is designed with the transmitter 5a and the receiver 6 as an optical distance measuring device. This makes it possible to discern whether there is slag and/or other foreign parts, for example elements that have been cut out of the sheet metal, in a space between two support elements. Such elements in a space can lead to a crash with a fork of a rake system or a component of a lifting system.

Figure 2:
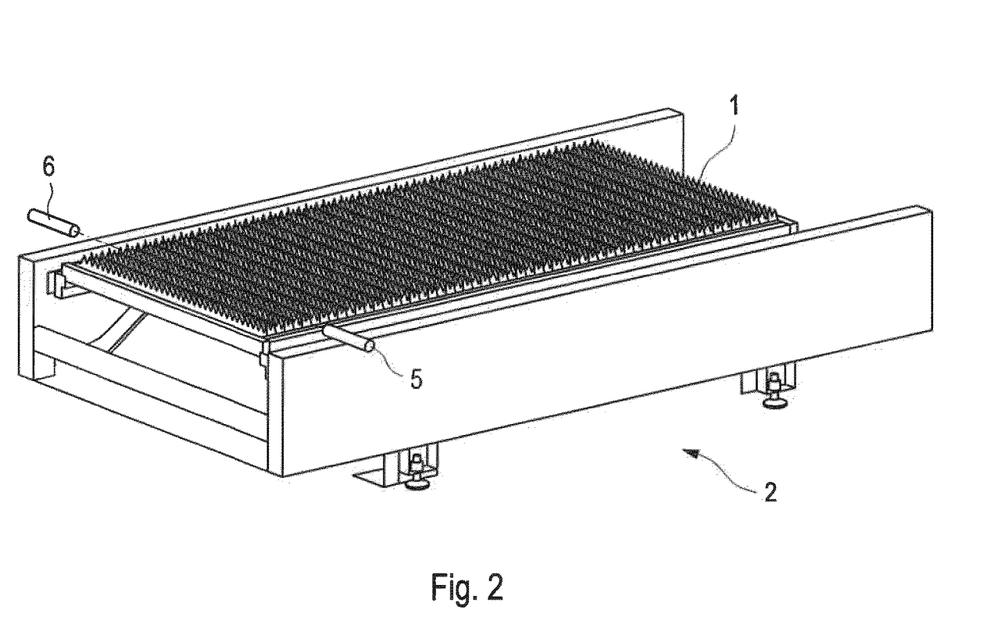
FIG. 2 shows a further worktable 2 in a perspective view with a sensor 5 and a receiver 6, which are arranged in a transmitted light method.

FIG. 2 shows another worktable 2 with support elements 1, wherein a transmitter 5a and a receiver 6 are arranged in a transmitted light method as a sensor 5, 6 for discerning slag between the support elements in such a way that the detection beam of the transmitter 5a is designed parallel to the support elements. The sensor 5, 6 can be displaced perpendicular to the support elements so that a plurality of, in particular all, spaces between the respective support elements 1 can be checked for slag or foreign parts.

In a particular embodiment, the sensor 5, 6 is designed in such a way that not only can it discern whether deposits or foreign parts are present in a space between the support elements 1, but it can also discern whether this is slag or a foreign part. The sensor can thus differentiate between deposits and foreign parts. This is important in order to be able to initiate various appropriate downstream measures. If slag but no foreign part is detected, the lifting system, for example, can still be used, since slag cannot offer any great mechanical resistance to a fork or prong. In this case, the fork or the prong would break away the slag and thus clear the space again. However, if the sensor 5, 6 discerns that a foreign part is jammed in a space, no attempt is made to lift the cut-out sheet metal with a lifting system. In this case, the risk of a crash is too high.

In a further particular embodiment, the sensor 5, 6 can be displaced perpendicular to the support elements 1 in such a way that a cross-sectional area of the space between two support elements 1 can be checked. In this case, therefore, not only a line between two support elements 1, but an area between two support elements 1 is checked for deposits and foreign parts.

Figure 3:
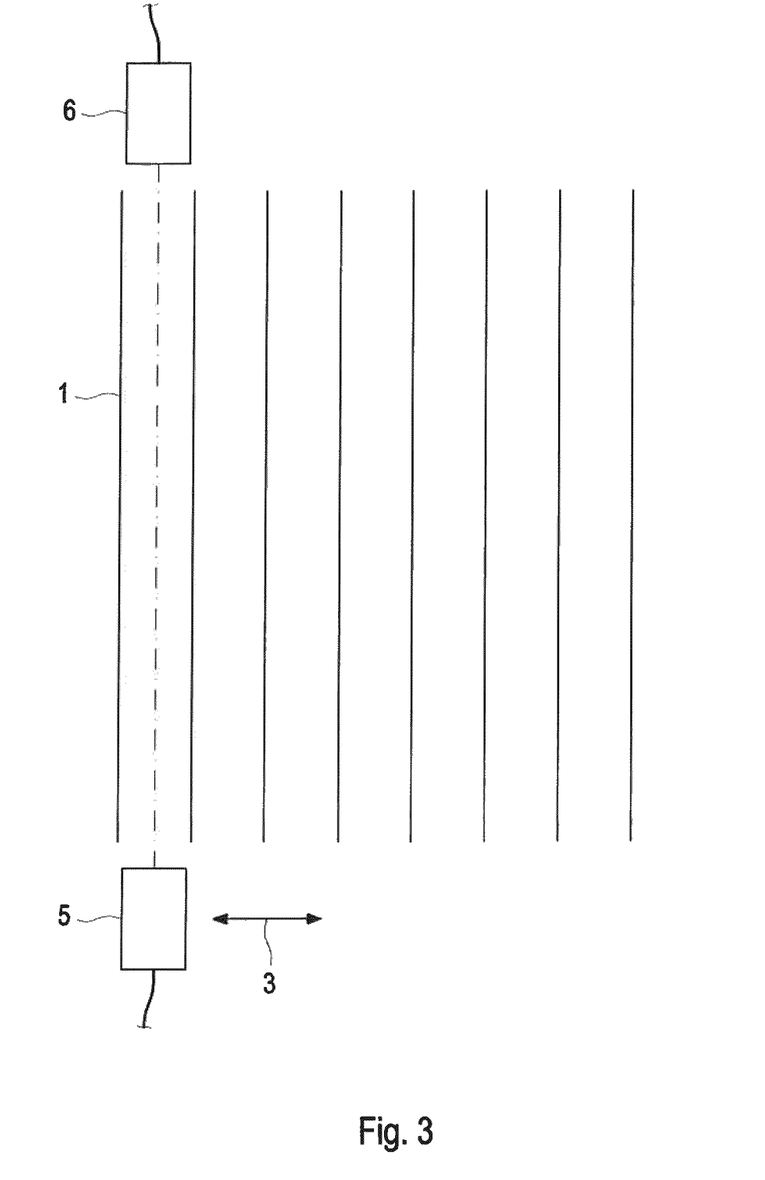
FIG. 3 shows a worktable 2 with support elements 1 in a plan view, wherein a sensor 5, 6 is arranged in a transmitted light method.

FIG. 3 shows a worktable with support elements 1 in a plan view, wherein a sensor 5, 6 with a transmitter 5a and a receiver 6 are arranged in a transmitted light method. The sensor 5, 6 with the sensor 5 and the receiver 6 can be displaced perpendicular to the support elements 1, so that all spaces between the respective support elements 1 can be checked for deposits and foreign parts.

Figure 4:
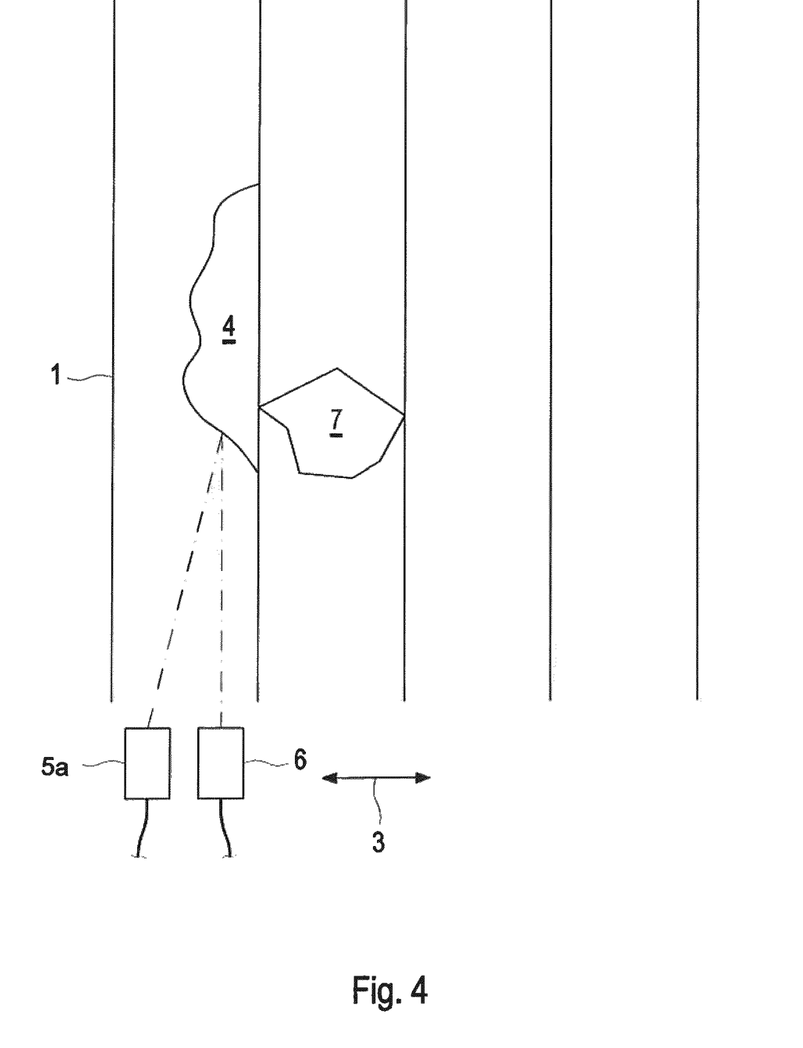
FIG. 4 shows a further worktable 2 with support elements 1 in a plan view, wherein a transmitter 5a and a receiver 6 are arranged as a sensor in a triangulation method.

FIG. 4 shows a further worktable with support elements 1 in a plan view with a sensor 5, 6, wherein a transmitter 5a and a receiver 6 are arranged in a triangulation method. The sensor 5, 6 can detect deposits 4 and foreign parts 7. For this purpose, the sensor 5, 6 can be displaced between the spaces between the support elements 1 in a perpendicular direction 3 to the support elements 1.

Figure 5:
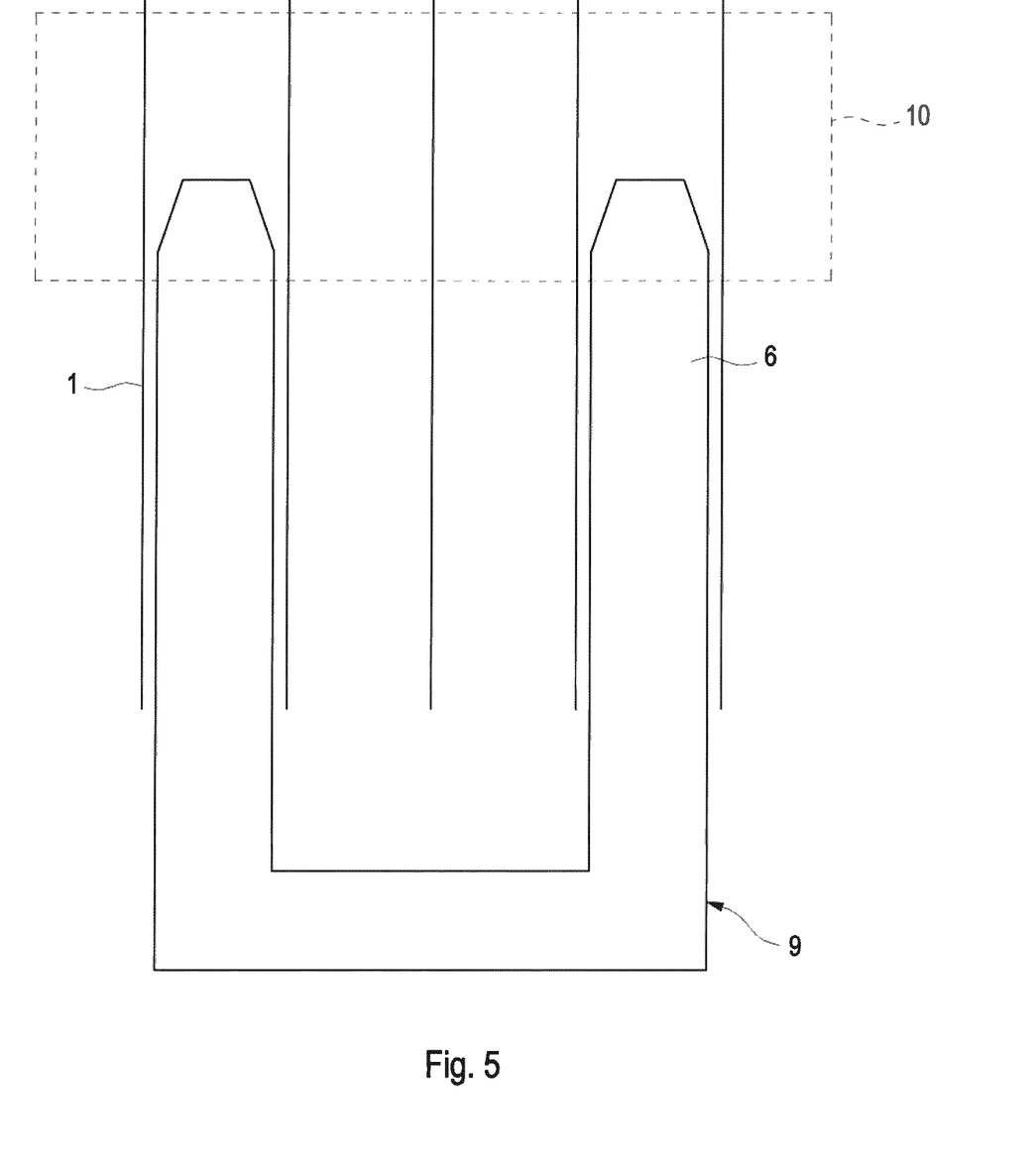
FIG. 5 shows the worktable 2 in a plan view with prongs 8 of a lifting system 9.

FIG. 5 shows a lifting system 9, the forks or prongs 8 of which can be introduced into the spaces between the respective support elements 1 under a piece of sheet metal 10 to be transported away. In a second step, the forks or prongs 8 are raised. By lifting the forks or prongs 8, the sheet metal 10 lying on the worktable is picked up and it can be transported away from the worktable by the lifting system.

The sensor 5, 6 is, for example, an optical sensor, in particular a laser. Alternatively, an ultrasound sensor can be used.

In an alternative embodiment, the transmitter and the receiver are arranged opposite one another in such a way that the spaces between adjacent support elements can be checked using the incident light method. The transmitters and receivers are therefore arranged above and/or below the worktable in this case.

It should be noted that the term "comprise" is to be understood as including and does not exclude further elements or method steps, just as the term "a" and "an" does not exclude a plurality of elements and steps.

The reference signs used are only used to increase understanding and are in no way to be viewed as restrictive, the scope of protection of the invention being rendered by the claims.

LIST OF REFERENCES SIGNS

1 Support elements, in particular grid bars
2 Worktable, in particular shuttle table, cutting table
3 Direction of displacement of sensor
4 Slag
5 Sensor
5a Transmitter
6 Receiver
7 Foreign part
8 Fork or prongs of a lifting system
9 Lifting system, in particular dual-fork system
10 Flat workpiece, in particular sheet metal

The invention claimed is:

1. A device for checking for an object on support elements of a worktable, wherein the support elements are provided to support a flat workpiece for processing with a laser or a water jet, wherein the support elements extend in a first direction across the worktable and are arranged parallel to one another in a second direction and have a first distance from one another in the second direction, the second direction being perpendicular to the first direction, comprising:

an optical sensor for detecting the object in a space between the two respective support elements arranged parallel to one another in the second direction and determining if the object is a foreign part or a deposit, the two support elements being configured to support the flat workpiece from a position vertically below the flat workpiece, the optical sensor being configured to be displaced along the worktable in the second direction in such a way that a cross-sectional area of the space between the two support elements that extend in the first direction and are separated in the second direction can be checked,
wherein the optical sensor is configured to scan the cross-sectional area between the two respective support elements and determine that the object is the foreign part when the object contacts both of the two respective support elements, wherein the object is the deposit when only one of the two respective support elements is contacted by the object,
wherein the optical sensor is configured to determine a distance to the object using a triangulation method or light transit time,
wherein the optical sensor is configured to determine a width of the object,
wherein a location of the object is determined using the distance and the two respective support elements; and
a light source configured to illuminate the object following detection by the optical sensor, wherein the light source is configured to indicate the location of the object determined by the optical sensor using a point of light,
wherein the device determines that a space between the respective supporting elements is sufficiently free of the object when the width of the object is less than a predetermined distance.

2. The device according to claim 1, wherein the optical sensor is configured as a transmitted light or incident light sensor.

3. The device according to claim 2, wherein the optical sensor comprises a transmitter and a receiver, wherein the transmitter is arranged opposite the receiver in such a way that a sensor beam is aligned in parallel and/or obliquely with the respective support elements, the space between which is to be checked, or wherein the transmitter and the receiver are arranged next to one another for checking the space by means of the triangulation method.

4. The device of claim 1, further comprising an image processing unit, which is configured to generate an output signal, wherein the optical sensor is in data exchange with the image processing unit, wherein the output signal differentiates a detected object disposed between the two support elements between the deposit or the foreign part.

5. A method of detecting objects on support elements of a worktable, and that at least partially block a space between adjacent support elements, with a device comprising an optical sensor for detecting the objects in the space between two respective support elements, wherein the optical sensor is displaceable and arranged along the worktable in a second direction perpendicular to the support elements in such a way that a cross-sectional area of the space between two support elements can be checked by the optical sensor, and light configured for illuminating the object following detection by the optical sensor, wherein the light source is configured to indicate a location of the object using a point of light, wherein the support elements are provided to support a flat workpiece for processing with a laser or a water jet, wherein the support elements extend in a first direction across the worktable and are arranged parallel to one another in the second direction and have a first distance from one another in the second direction, the second direction being perpendicular to the first direction, wherein the optical sensor determines a distance to the object using a triangulation method or a light transmit time such that the location between the adjacent support elements is determined by the optical sensor and illuminated by the light source, wherein the optical sensor determines a width of the object, the method comprising:
checking the space between a first and a second support element for the object on the first and/or second support elements and determining if the object is a foreign part or a deposit, wherein the object is the foreign part when the object contacts both of the first and second support elements and wherein the object is the deposit when the object contacts only one of the first and second support elements, wherein the first and second support elements each extend in the first direction across the worktable and support the flat workpiece from a position vertically below the flat workpiece, wherein the optical sensor is configured to be displaced along the worktable in the second direction to check a cross-sectional area of the space between the first and second support elements, the space extending in the first direction,
generating an output signal indicating that the object is either the foreign part or the deposit, and
determining that the space between the first and second support elements is sufficiently free of the object when the width of the object is less than a predetermined distance.

6. The method according to claim 5, further comprising:
displacing the optical sensor along the worktable; and
checking the space between a third and a fourth support element for objects, the third support element and the fourth support element each extending in the first direction; and
illuminating the locations of objects on the worktable that have been detected by the optical sensor in the spaces between the support elements.

7. The method according to claim 5, wherein checking the space between the first and second support elements comprises the optical sensor checking the space between a first distance to the first support element and a second distance to the second support element, wherein the first distance and the second distance are the predetermined distance.

8. The method according to claim 7, wherein the first distance and/or the second distance are in a range between 10 and 15 mm or are at least 12 mm.

9. The method according to claim 5, further comprising:
removing at least the objects larger than the predetermined distance by means of (i) at least one of compressed air, the laser, or the water jet, or (ii) vibration, including a vibration of a system for lifting the flat workpiece from the worktable after the workpiece has been processed.

10. The method of claim 5, wherein the device includes an image processing unit, which is designed to generate the output signal, wherein the optical sensor is in data exchange with the image processing unit, wherein the output signal differentiates a detected object between the deposit or the foreign part by determining the width of the detected object.

11. A non-transitory computer program product having a software program comprising a set of commands which when loaded onto a computer, and connected to a device for checking for objects on support elements of a worktable, wherein the support elements are configured to support a flat workpiece for processing with a laser or a water jet, wherein the support elements extend in a first direction across the worktable and are arranged parallel to one another in a second direction and have a first distance from one another in the second direction, cause the device to execute a method comprising:
checking a space between a first and a second support element for objects on the first and/or second support elements and determining if the objects include foreign parts or deposits using an optical sensor, wherein the objects are the foreign parts when the objects contacts both of the first and second support elements and wherein the objects are the deposits when the objects contact only one of the first and second support elements, wherein the first and second support elements each extend in the first direction across the worktable and support the flat workpiece from a position vertically below the flat workpiece, wherein the optical sensor is configured to be displaced along the worktable in the second direction to check a cross-sectional area of the space between the first and second support elements, the space extending in the first direction;

generating an output signal for each of the objects, the output signal indicating that each of the objects is either the foreign part or the deposit, and determining that the space between the first and second support elements is sufficiently free of the objects when none of the objects has a distance greater than a predetermined distance.

\* \* \* \* \*